March 7, 1944.　　　　E. E. SAWYER　　　　2,343,330
METHOD OF MANUFACTURING RESIN-BEARING FIBROUS PULP ARTICLES
Filed May 6, 1943　　　2 Sheets-Sheet 1
*Fig. 1*
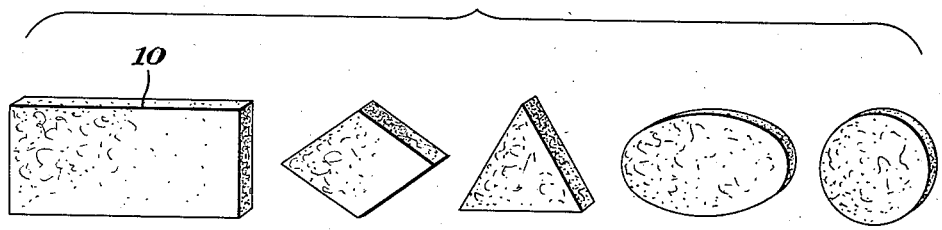
*Fig. 2*　　　*Fig. 3*
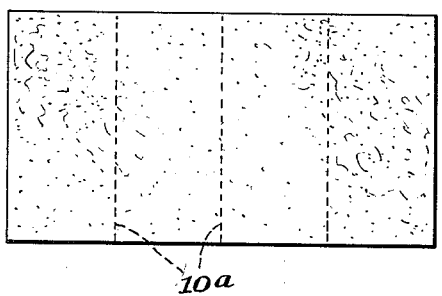 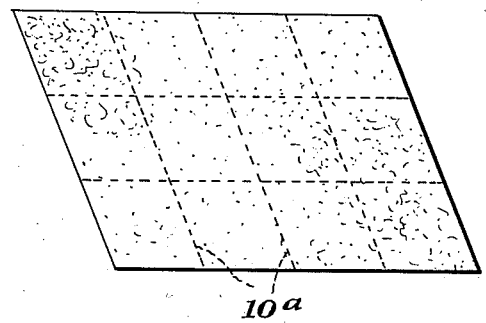
*Fig. 4*
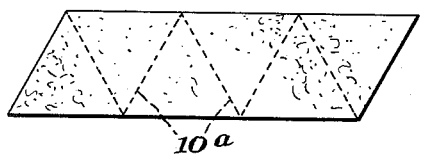
*Fig. 5*
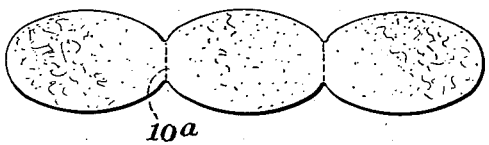
*Fig. 6*
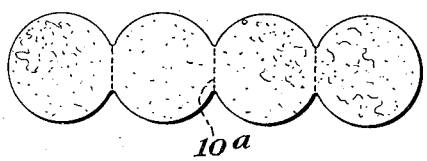
*Fig. 7*
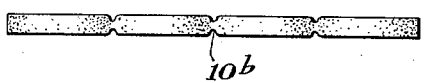
INVENTOR
EDWARD E. SAWYER
BY Spear, Rawlings & Spear.
ATTORNEYS March 7, 1944.   E. E. SAWYER   2,343,330
METHOD OF MANUFACTURING RESIN-BEARING FIBROUS PULP ARTICLES
Filed May 6, 1943   2 Sheets-Sheet 2
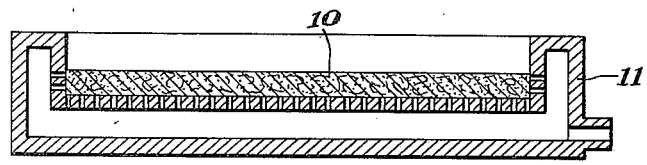
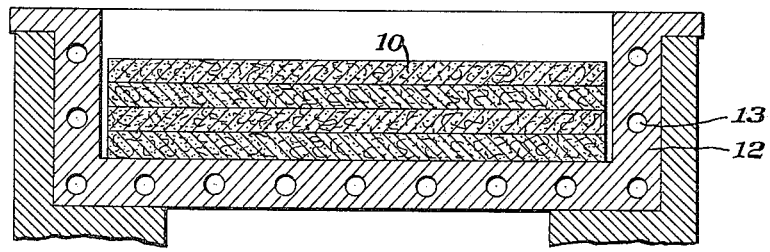
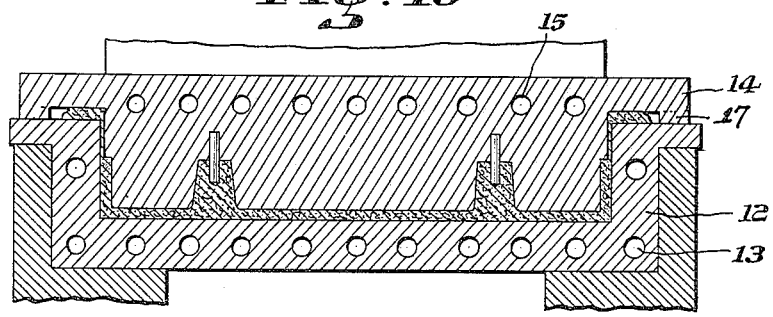
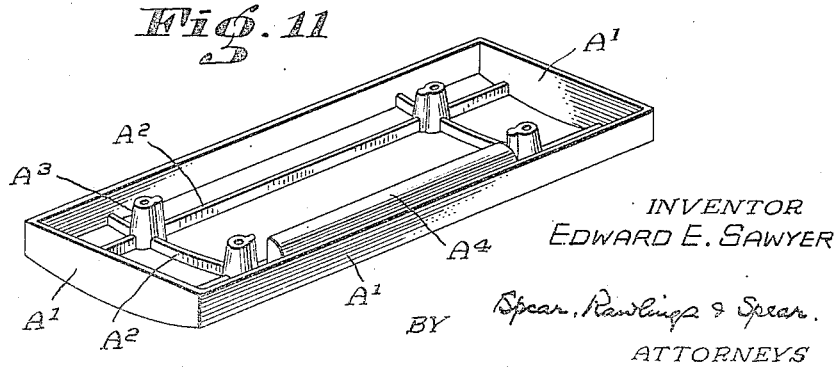
INVENTOR
EDWARD E. SAWYER
BY Spear, Rawlings & Spear.
ATTORNEYS Patented Mar. 7, 1944

2,343,330

UNITED STATES PATENT OFFICE 2,343,330

METHOD OF MANUFACTURING RESIN-BEARING FIBROUS PULP ARTICLES

Edward E. Sawyer, Waterville, Maine, assignor, by mesne assignments, to The Canal National Bank of Portland, Portland, Maine, as trustee Application May 6, 1943, Serial No. 485,790

2 Claims. (Cl. 18—47.5)

This invention relates to the manufacture of resin-bearing fibrous articles which, due to their shape, cannot be satisfactorily manufactured by the method disclosed in my prior Patent No. 2,274,095, dated February 24, 1942, and is a continuation-in-part of my prior application, Ser. No. 418,581, filed Nov. 10, 1941.

Among such articles are cups, pails, and other cylindrically shaped articles having substantially perpendicular sides, as well as articles having partitions, strengthening ribs, projections, and built-in sections.

Where it is attempted to manufacture such articles from molded-to-shape, resin-fibre preforms, the thickness of the dried preform is approximately three to five times greater than that of the finished article. Consequently, if a molded-to-shape preform of this thickness having a nearly perpendicular side wall were to be placed in the cavity of a female finishing die, where the clearance between the female die and the male die is so much less than the thickness of the preform, the contact of the male die with the preform when the dies are closed would destroy its shape by pressing the side wall of the preform down into the female die cavity.

Likewise, in an article where a projection is required, if it were possible to mold this projection in the preform, its thickness would be too great to allow it to fit into the projection defining recess of the male finishing die, and consequently such preformed projection would be destroyed when the dies are closed.

According to my present invention, I produce such shaped articles by wet molding on a foraminous forming die from an aqueous resin-fibre mixture a substantially flat, loosely felted, resin-fibre layer or blank. These blanks correspond substantially in size and shape to that of the projected area of the bottom of the female finishing die.

After these resin-fibre blanks have been wet molded, they are dried and one or more of such blanks of the weight required for a mold charge is placed in the cavity of a female die of a heated finishing die set. The dies are then closed and under heat and pressure, the resin of the mold charge is melted and forced into every contour of the die cavity, carrying with it in suspension the fibres of the mold charge as a substantially uniform resin-fibre mixture.

When this operation is completed, the dies are opened and the finished article removed.

In the accompanying drawings I have illustrated schematically a preferred method of practicing my invention.

Fig. 1 is a view showing a variety of shapes and sizes of dried resin-fibre blanks individually molded on individual foraminous forming dies.

Figs. 2 to 6, inclusive, show how any of the shapes of Fig. 1 which may be required in relatively small sizes can be molded in multiple form on a single suction die and thereafter separated for use as individual mold charges.

Fig. 7 is an edge view of Fig. 6 but showing tear grooves pressed into the multiple blank during the molding operation to facilitate separation of such blank into individual blanks.

Fig. 8 is a cross section through a conventional foraminous forming die showing the method of suction-molding any of the blanks illustrated in Figs. 1 to 7, inclusive.

Fig. 9 is a vertical section through the female die of the heated finishing die set, the die cavity being filled with the proper weight of blanks as a mold charge.

Fig. 10 is a vertical section through the heated finishing die set, showing the dies closed and the molten mold charge forced under heat and pressure into every contour of the die cavity, and Fig. 11 is a perspective view of a finished article.

For the purposes of illustration I have shown in Fig. 11 a finished article of special shape. Such article is of generally rectangular shape and may be flat or slightly curved. It has an inwardly extending marginal flange A' disposed at substantially right angles to the plane of the body portion and constituting a rim. Within the rim are several projections likewise disposed at substantially right angles to the plane of the body portion. These may include relatively low longitudinally and transversely extending stiffening ribs $A^2$, a plurality of relatively long posts $A^3$ at the intersections of said ribs, and a flange $A^4$ of substantial size extending angularly inward from the body portion adjacent one of the longitudinal flanges A'.

In producing this article, I wet-mold from an aqueous fibrous pulp mixture preferably containing uncured synthetic resin in comminuted form, rectangular shaped resin-fibre blanks similar to the blank 10 of Fig. 1. Preferably these blanks are suction-molded on a conventional foraminous forming die, such as that illustrated at 11 in Fig. 8, and correspond substantially in size and shape to the projected area of the bottom of the female finishing die. After the blanks are molded they are removed from the forming dies and dried, and are now ready for immediate finishing, or they may be stored for future finishing, or they may be shipped from the place of manufacture to any place where they are to be finished.

In the finishing operation, one or more dried blanks 10 totaling the required weight is placed as a mold charge in the die cavity of a female heated finishing die 12. The female die may be heated as indicated at 13 and the male die 14 may be likewise heated as indicated at 15.

The heated male die is forced under mechanical pressure into the cavity of the heated female die and under this heat and pressure the resin in the mold charge is melted and the pressure causes the mass of molten resin and fibres to flow into and completely fill every part of the die cavity.

During this movement of the molten resin and fibres the mix remains substantially uniform, resulting in a finished article of substantially uniform resin fibre composition throughout. Sufficient clearance 16 between the male and female dies is allowed so that during the closing of the dies a slight amount of the mold charge may slowly escape, this to take care of any surplus of mold charge over and above that required for the finished article. Stops 17 may be provided to limit the closing movement of the dies.

When a thermo-setting resin is used, the dies are maintained closed, except as is sometimes required for momentary openings to relieve generated gases, until the resin has hardened and thereby locked the fibres in fixed and permanent positions in the finished article.

When a thermo-plastic resin is used, however, it may be necessary to cool the article so as to harden the resin before the pressure is relieved and the article removed from the finishing dies. This is accomplished by cooling the dies.

In general, I prefer to mold my blanks 10 on individual suction dies. However, in the case of blanks to be used for the manufacture of relatively small articles, it is more economical to suction-mold these blanks in multiple form on a single die. Such multiple blanks are shown in Figs. 2 to 7, inclusive. This method is more economical than molding the equivalent number of small blanks on individual suction dies. The use of a single die reduces the die costs and effects a worthwhile saving in the maintenance and operating costs of the molding equipment.

The shape of the multiple blanks is such that they can be separated along the lines 10ᵃ into individual blanks of the required size and shape with little or no wastage of material. This separation may be accomplished in any suitable manner, as by shearing, or each multiple blank may be provided with tear grooves such as shown at 10ᵇ in Fig. 7 at the lines along which the individual blanks are to be separated, such tear grooves being pressed into the multiple blank during the molding step.

The ratio of fibre to resin in my blanks may vary according to the characteristics wanted in the finished article. In general, the blanks contain sufficient fibre to give the desired strength and sufficient resin to give the desired flow and finish and other required properties. In all cases whether blanks are molded individually or molded in multiple form and then separated, the resultant shape is substantially that of the projected area of the bottom of the female finishing die. A mold charge would be made up of at least one of the above described blanks.

For my resin I prefer to use a synthetic resin of the phenol-formaldehyde type in dry comminuted form, although other resins, either thermoplastic or natural, may be used.

Various modifications in procedure and materials may obviously be resorted to within the spirit and scope of my invention as defined by the appended claims.

What I therefore claim and desire to secure by Letters Patent is:

1. In the method of manufacturing a resin-bearing fibrous pulp article by hot pressing a mold charge to the desired article shape and thickness between a pair of imperforate heated dies, the steps which comprise intimately mixing resin and fibres in a liquid vehicle, suction-forming substantially flat blanks from said liquid mixture on foraminous forming dies, removing said blanks from the forming dies and drying the same, placing at least one of said blanks into one of said pair of dies, said dies having a configuration substantially different from the configuration of said blanks, closing said die pair on the mold charge under sufficient heat and pressure to melt the resin and cause the mass of melted resin and fibres to flow as a substantially uniform mixture into every contour of the die cavity, maintaining the dies closed and under pressure until the resin has hardened, and opening the die pair and removing the article.

2. In the method of manufacturing a resin-bearing fibrous pulp article by hot pressing a mold charge to the desired article shape and thickness between a pair of imperforate heated dies, the steps which comprise intimately mixing resin and fibres in a liquid vehicle, suction-forming substantially flat blanks in multiple form from said liquid mixture on foraminous forming dies, removing said multiple blanks from the forming dies and drying the same, separating said multiple blanks into individual blanks, placing at least one of said individual blanks into one of said pair of dies, and said dies having a configuration substantially different from the configuration of said blanks, closing said die pair on the mold charge under sufficient heat and pressure to melt the resin and cause the mass of melted resin and fibres to flow as a substantially uniform mixture into every contour of the die cavity, maintaining the dies closed and under pressure until the resin has hardened, and opening the die pair and removing the article.

EDWARD E. SAWYER.